United States Patent
Silver et al.

[11] Patent Number: 6,073,866
[45] Date of Patent: Jun. 13, 2000

[54] APPARATUS METHODS AND SYSTEMS FOR PULVERIZING AND CLEANING BRITTLE RECYCLABLE MATERIALS

[76] Inventors: James S. Silver, 87 S. 350 East, North Salt Lake, Utah 84054; Fred Bunke, 17300 Lock Two Rd., Botkins, Ohio 45306; Richard J. Leonard, 742 E. 18th Ave., Salt Lake City, Utah 84103; Stewart L. Grow, 4000 Brown Canyon Rd., Peoa, Utah 84061

[21] Appl. No.: 09/263,367

[22] Filed: Mar. 5, 1999

[51] Int. Cl.[7] .............................. B02C 19/14; B02C 23/08
[52] U.S. Cl. ........................... 241/19; 241/23; 241/24.19; 241/24.22; 241/29; 241/65; 241/79.1; 241/99
[58] Field of Search ............................... 241/65, 79.1, 99, 241/101.74, DIG. 38, 19, 23, 24.12, 24.19, 24.22, 27, 29

[56] References Cited

U.S. PATENT DOCUMENTS

| | | |
|---|---|---|
| 1,171,747 | 2/1916 | Newhouse . |
| 3,151,814 | 10/1964 | Morgan et al. . |
| 3,655,138 | 4/1972 | Luscombe . |
| 3,713,596 | 1/1973 | Hoffmann . |
| 3,889,886 | 6/1975 | Spivey . |
| 3,897,330 | 7/1975 | Rhys .......................................... 209/75 |
| 3,946,953 | 3/1976 | Hato . |
| 4,098,466 | 7/1978 | MacElvain et al. . |
| 4,358,995 | 11/1982 | Ballo et al. ............................. 241/99 X |
| 4,651,934 | 3/1987 | Bender et al. . |
| 4,786,003 | 11/1988 | Johnson . |
| 4,795,103 | 1/1989 | Lech ........................................... 241/77 |
| 5,042,724 | 8/1991 | Perry . |
| 5,215,264 | 6/1993 | Lundquist . |
| 5,215,265 | 6/1993 | Lodovico . |
| 5,242,126 | 9/1993 | Bomze . |
| 5,310,122 | 5/1994 | McFarlane . |
| 5,350,120 | 9/1994 | Melchionna . |
| 5,350,121 | 9/1994 | Vitunac et al. . |
| 5,484,109 | 1/1996 | Cook . |
| 5,505,390 | 4/1996 | Rodgers . |
| 5,520,343 | 5/1996 | Aika et al. ................................ 241/99 |
| 5,524,837 | 6/1996 | Raynes . |
| 5,580,002 | 12/1996 | Ward et al. . |
| 5,586,730 | 12/1996 | Mortrud ............................... 241/24.22 |
| 5,620,146 | 4/1997 | Lukas . |
| 5,683,041 | 11/1997 | Sewill et al. . |
| 5,758,832 | 6/1998 | Grainger . |
| 5,775,604 | 7/1998 | Sato ..................................... 241/24.22 |
| 5,833,151 | 11/1998 | Doak . |
| 5,887,804 | 3/1999 | Hansen . |
| 5,895,000 | 4/1999 | Shinjo et al. . |

FOREIGN PATENT DOCUMENTS

| | | |
|---|---|---|
| 90-376943/51 | 12/1990 | Germany . |
| 6-55087 | 3/1994 | Japan . |
| 6-238180 | 8/1994 | Japan . |

OTHER PUBLICATIONS

"Prodeva Glass Crusher, Model 318" (1994).

*Primary Examiner*—John M. Husar
*Attorney, Agent, or Firm*—Workman Nydegger Seeley

[57] ABSTRACT

A pulverizing pass having at one side an adjustable crushing plate which forces the material entering to pass between the plate and variable speed replaceable rotating hammers which are substantially open causing the material to be pulverized. The chamber is lined with plates which can be repeatedly replaced. In addition, heat is applied to the material throughout the process by two open flame furnaces whereby the material exits dry. Further a means for removing contaminants from the glass is accomplished by three blower devices which suck the contaminants into three collection bags whereby the finished product exits 99.9 plus % clean.

46 Claims, 4 Drawing Sheets

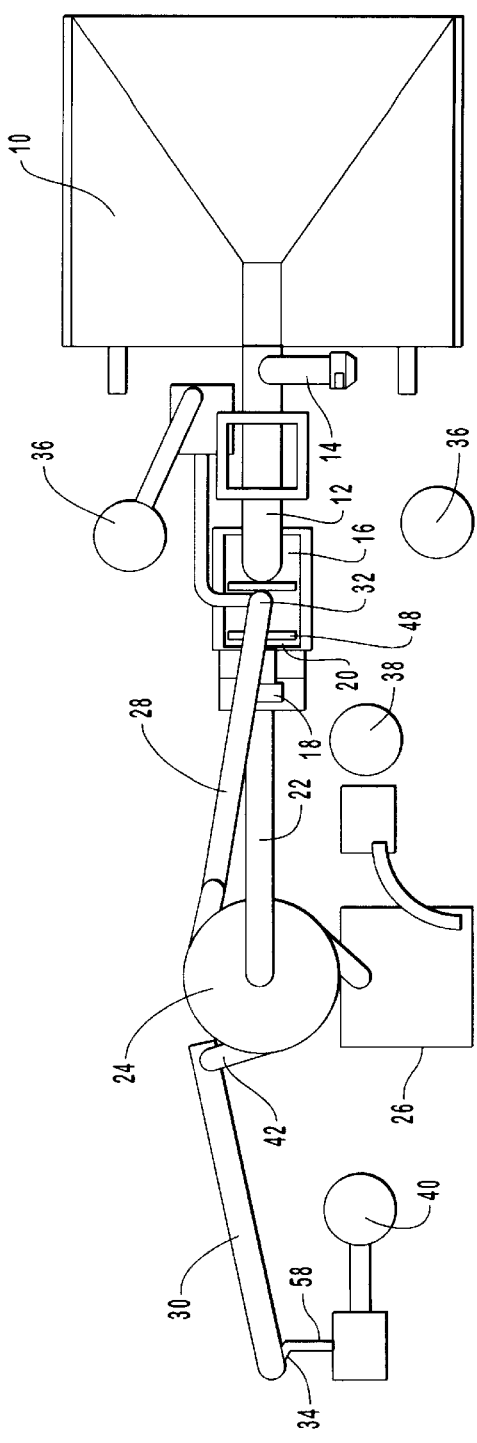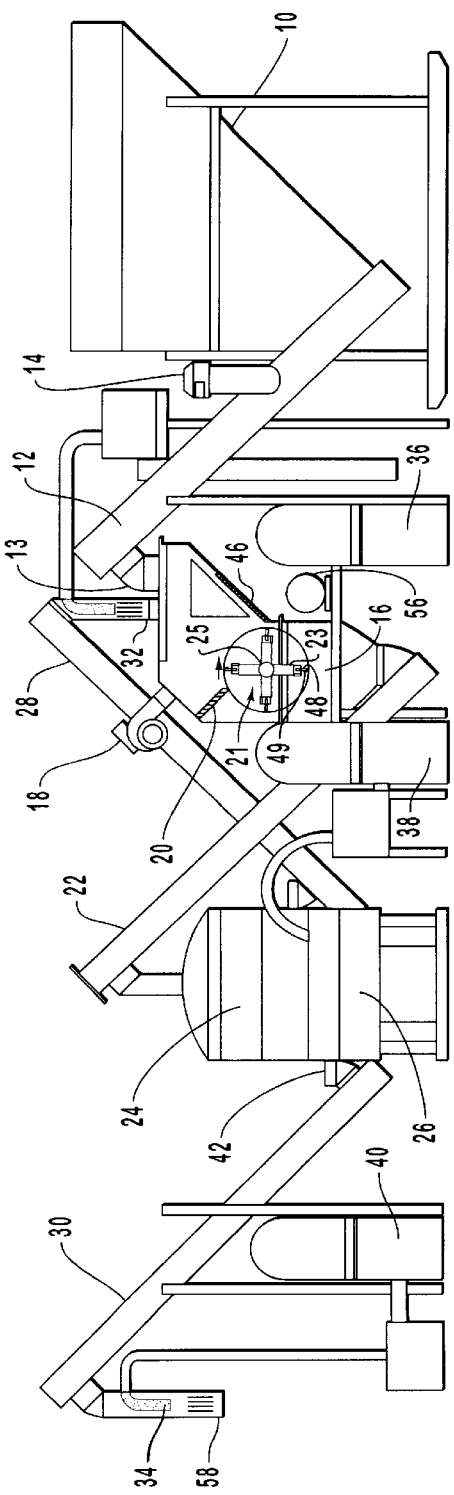

APPARATUS METHODS AND SYSTEMS FOR PULVERIZING AND CLEANING BRITTLE RECYCLABLE MATERIALS

This utility patent application claims priority to U.S. Provisional Patent Application Serial No. 60/077,002, filed Mar. 6, 1998, entitled Methods and Systems for Recycling Glass which was filed by James S. Silver, Fred Bunke, Richard J. Leonard and Stewart L. Grow. Serial No. 60/077,002 is hereby incorporated by reference.

BACKGROUND OF THE INVENTION

1. The Field of the Invention

This invention relates to apparatus, methods and systems for grinding, cleaning and drying brittle recyclable materials such as glass. More particularly, the invention relates to processing contaminated post consumer waste recyclable materials and turning it into a clean and dry usable raw material.

2. The Prior State of the Art

In order for recycled glass to be used as a raw material in such high end products as fiberglass it must be 99.9% free of contaminants, and dry. The only benefication plants that come close to doing this cost up to $3 million dollars to build. Other less expensive systems, such as those sold under the names Enviro Mill and Andelah for about $100,000, fail to yield a product which is anywhere near 99.9% clean.

At the present time, most glass is being recycled back into the container industry. Why? Because a container manufacturer can purchase enough recycled glass to cover the costs of building an expensive benefication plant.

A glass container is 100% recyclable and can be recycled over and over again with no loss in quality of purity, the drawback being that the glass must be sorted by colors, the industry using a majority of flint, 60%, then amber, 23%, then green, 13%.

The fiberglass industry, along with other emerging industries, can use large quantities of broken mixed glass (glass that is not sorted), but the glass must be 99.9% contaminant free. Even most of the current benefication plants fail to meet these standards.

The reason these industries are seeking clean sources of recycled glass is because glass melts at a lower temperature than the normal raw materials used to make glass allowing the manufacturing company to lower its energy costs while at the same time increasing the life of its equipment. In a normal melting furnace, for every 10% of recycled glass used, there is approximately a 2.5% reduction in energy used.

Approximately 80% of all post consumer bottle waste glass is now being recycled back into glass containers. Thus, this is where processors of post consumer waste glass have focused their efforts. These processors have relied on technology which although adequately providing the container industry with a usable raw material, the material is not clean enough to be used as a feed stock for other high end uses such as fiberglass.

In the past few years, because other industries such as the fiberglass industry have begun to seek sources of recycled glass, significant resources have been invested in trying to improve glass recycling. Innovations include automated color separation, mechanized ceramic sorting, organic color coating and attempts at improving grinding technologies. However, in most cases, all this state-of-the-art processing equipment has managed to do is increase the cost of recycled glass, making it even more uneconomical for high end-users to use recycled glass as a substitute raw material.

Most processing systems grind the glass in the same chamber with the contaminants making the recycled glass usable only for such low end uses as landfill, glassphalt, and as a trench bedding material for piping. These systems do allow communities to recycle this waste glass, keeping it out of the landfill and from polluting the environment, but at a high economical cost.

Transportation costs are also a major obstacle to the use of recycled glass. If a high end-user of recycled glass is not located in the immediate area of a community, most end up dropping glass from their recycling program simply because they cannot afford the economic drain.

Accordingly, there is a need for improved apparatus, methods and systems for grinding and cleaning glass that overcome or avoid the above problems.

SUMMARY AND OBJECTS OF THE INVENTION

The present invention has been developed in response to the present state of the art and, in particular, in response to problems and needs that have not been fully or completely solved by currently available apparatus, methods and systems for pulverizing and cleaning glass.

This invention differentiates itself from other glass benefication systems in two respects, first, it does not pulverize the glass and contaminates in an enclosed chamber, making it possible to remove the contaminates by suction, and second, it can build a benefication plant for under $100,000 dollars. What this means is community after community can now look at their broken mixed waste glass as a product to be mined rather than as a waste material filling their landfills and polluting their environment. What it also means is all kinds of new products will be developed to use this affordable new raw material.

Accordingly, besides the objects and advantages of the apparatus, methods and system described above, one of the objects and advantages of the invention is to provide a glass grinding system which can successfully separate contaminates from any kind of material.

Another object of the invention is to provide a processing system which is compact, and can be moved to any location where material exists that needs to be recycled.

An additional object of the invention is to provide a processing system which is easy and inexpensive to maintain.

In accordance with the present invention one embodiment of the glass processing system comprises a clipping mechanism, and open flame furnace, a separator and a vacuum system.

From the description above, a number of advantages become evident:

1. One person can easily operate and maintain the entire system.

2. The entire system can be set up in a relative small space.

3. In every community, mixed broken waste glass can be economically turned into a clean usable raw material.

4. The small economically operated and maintained system can be made portable and moved to the location of the material eliminating double handling and shipping of material.

5. The open flame furnace dries the material, allowing the material to be blown into silos where it can be stored for future use.

6. The material has no sharp edges allowing the material to even be used in sand boxes.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is schematic top view of an embodiment of the invention.

FIG. 2 is schematic side view of an embodiment of the invention.

DETAILED DESCRIPTION OF THE PREFERRED EMBODIMENTS

A typical embodiment of the material processing system of the present invention is illustrated in FIGS. 1 and 2. The invention is primarily intended to be utilized with glass, however, the invention can also be utilized with other brittle recyclable materials.

Figure 4:
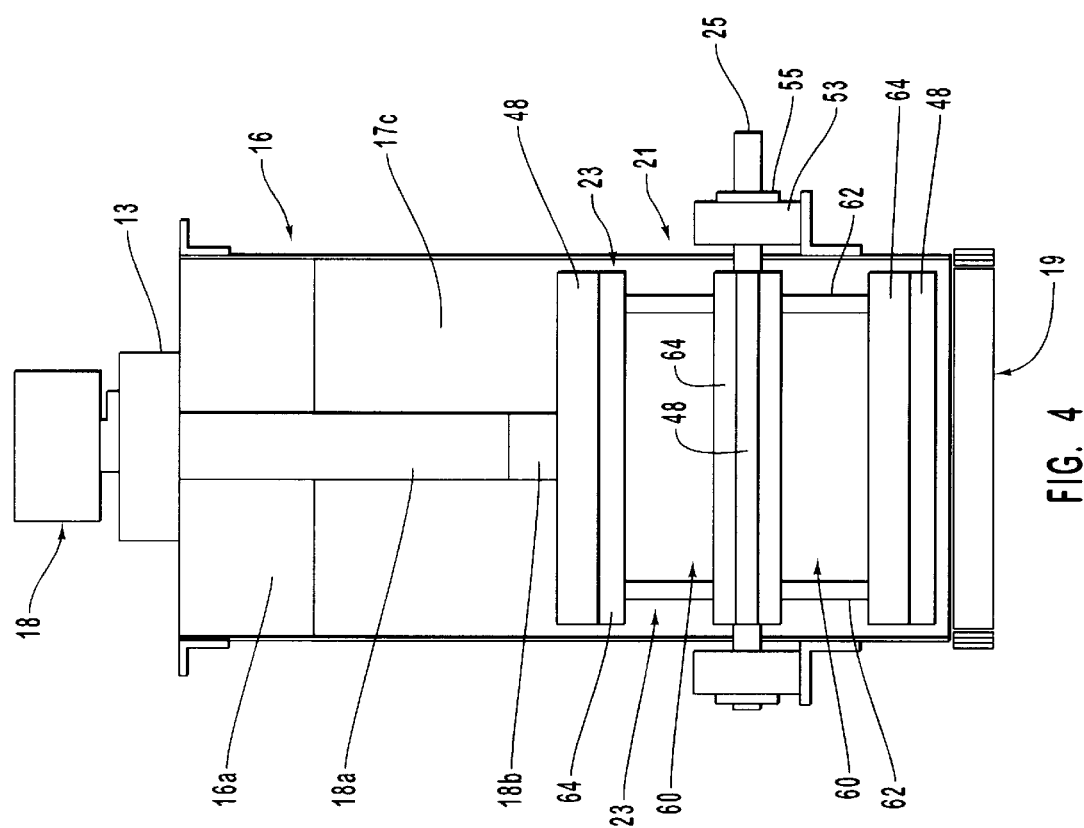
FIG. 4 is an enlarged schematic front view of a pulverizer pass 16.
Figure 5:
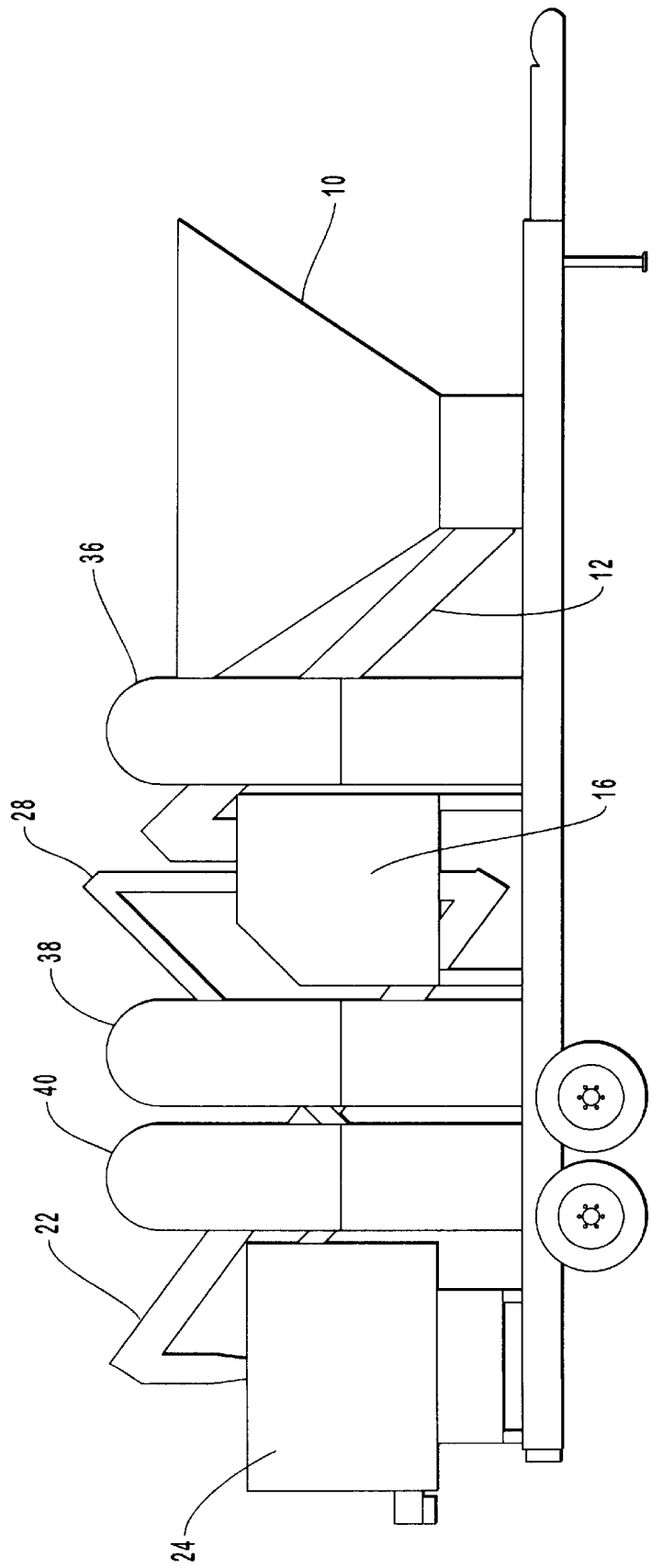
FIG. 5 is a schematic view of the system on a trailer 100.

The primary components are the hopper 10, the pulverizer pass 16, the shaker separator 24 and the output 42. Augers connect the primary components together to transport the material between each primary component by receiving the material and then depositing the material at the subsequent primary component. Each auger is an example of a transport means for transporting material. The configuration of the components of pulverizer pass 16 are shown in detail in FIGS. 3 and 4. The ability of the system to be transportable on a tractor-trailer 100 is shown in FIG. 5.

Figure 3:
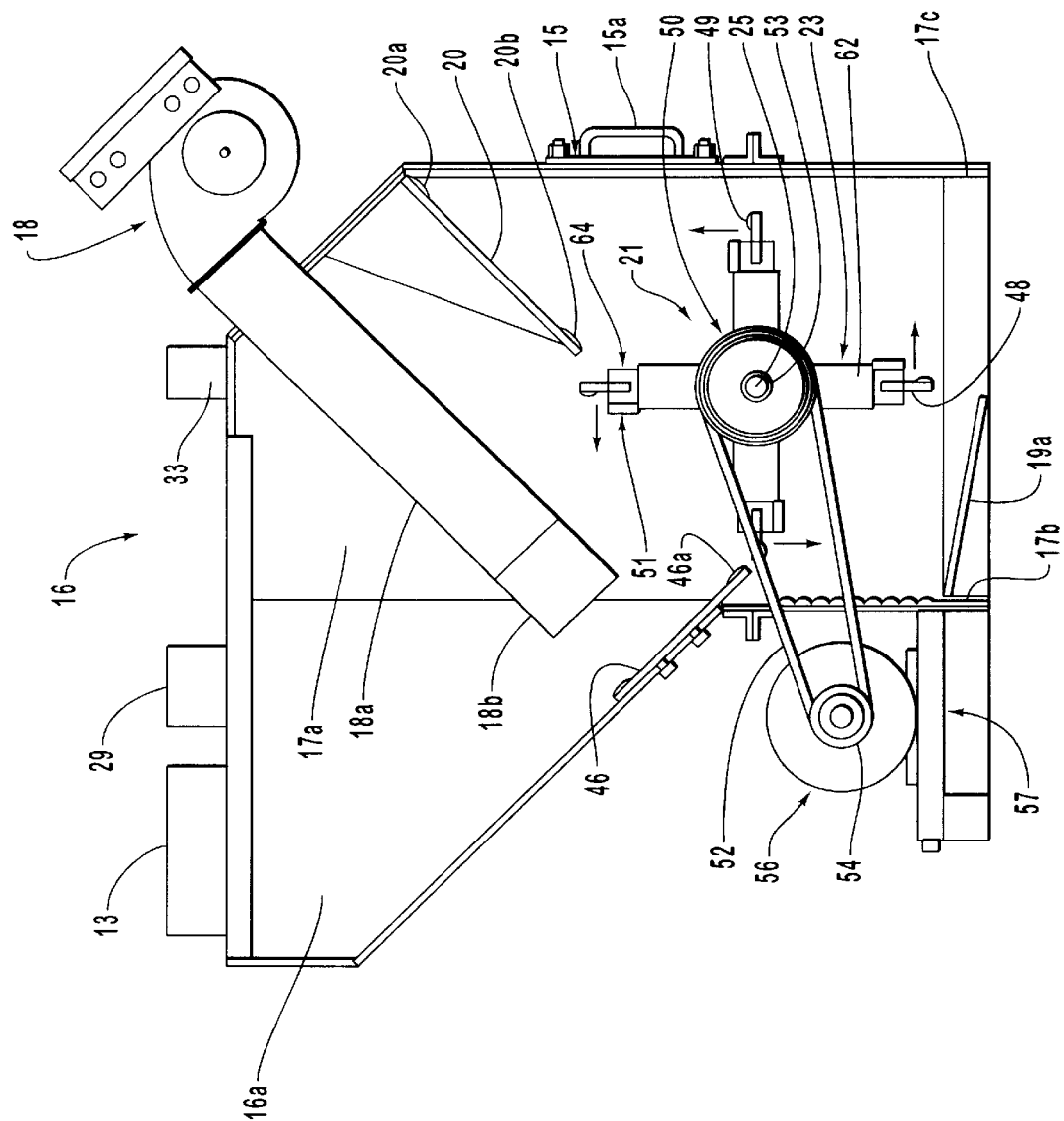
FIG. 3 is an enlarged schematic side view of a pulverizer pass 16.

The material is fed into pulverizer pass 16 by a variable speed auger 12 attached to a self feeding hopper 10 which is shown with slanting sides. The material is self-fed by hopper 10 into an auger as shown, or a conveyor system, which is another example of a transport means. The material is preferably passed by an open flame furnace as shown at 14 which heats and dries the material before emptying it into pulverizer pass 16 where the material passes through an open flame furnace 18 to further heat and dry the material as it is clipped and pulverized by a variable speed rotatable crusher shown at 21. As shown in FIG. 3, open flame furnace or dryer 18 is coupled to pulverizing pass 16 in a manner such that the brittle recyclable material is dried before being pulverized. Open flame furnace or dryer 18 has a dryer tube 18a which extends through pulverizing pass 18 and terminates at baffles 18b.

Note that the material carried by auger 12 enters the upper housing 16a of pulverizer pass 16 via main feed inlet 13. Note also that pulverizing pass 16 is lined with replaceable wear liners as shown in FIGS. 3 and 4 at 17a–c. More particularly, pulverizing pass has wear liners on its front and rear walls as shown at 17b and 17c and on its sides as shown at 17a. Pulverizing pass 16 is further protected by hardfacing 16b on the wall of pulverizing pass below adjustable crushing plate 46. Pulverizing pass 16 may also have an access door shown at 15 with a handle 15a to provide access for adjusting or replacing the various adjustable or replaceable components. A rotatable crusher within the scope of the present invention such as rotatable crusher 21 as best seen in FIGS. 3 and 4 comprises a rotor shaft such as rotor shaft 25, rotating hammers or rotors such as rotors 23, which extend from rotor shaft 25 and have large open sections, and a means for rotating the rotor shaft. Pulverizer pass 16 and rotatable crusher 21 are an example of a pulverizer means for pulverizing brittle recyclable material. Each of the four hammers 23 are shown extending perpendicularly from rotor shaft 25 such that each hammer is perpendicular with respect to each adjacent hammer. Each hammer 23 has two arms 62 extending from opposing ends of rotor shaft 25. Each arm 62 is coupled to a blade mounting base 64. A replaceable impact blade 48 extends from each blade mounting base 64 of each hammer in a configuration to provide a close tolerance with crushing plate 46 of pulverizing pass 16 such that brittle recyclable material is pulverized as hammers 23 are rotated past crushing plate 46. Note each open section 60 of each hammer shown in FIG. 4 is defined by rotor shaft 25, two arms 62, and a blade mounting base 64 such that each hammer is substantially open. The material is kept from circulating in the pulverizer pass 16 by an adjustable deflector plate 20, extending within pulverizing pass 16 above the rotating hammers 23. Deflector plate 20 is attached to pulverizing pass 20 by a deflector bracket 20a. Deflector plate deflects any pulverized brittle recyclable materials directed upwards within pulverizing pass 16 back down such that it is directed out of pulverizing pass by discharge deflector plate 19a. After exiting the discharge outlet 19 of pulverizing pass 16, the pulverized or shattered brittle recyclable material is moved by auger 22 to shaker separator 24. Shaker separator 24 is an example of a means for sorting the pulverized material by size and separating the pulverized recyclable material, namely glass, from the non-recyclable or non-brittle material, such as metal, bottle caps, paper, plastic, and etc.

The contaminates are sucked into contaminant collector container 26, the larger sized pieces of material that will not pass through the finished product screen are sent back to be re-clipped via auger 28, and the appropriately sized material is removed via auger 30. Pulverized brittle recyclable material which has been sorted and is oversized, are returned into pulverizing pass 16 from auger 28 via regrind feed inlet 29 for further pulverizing. Auger 28 is an example of an oversized sorted material transport means for returning oversized sorted material back to the pulverizer means. Auger 30 is an example of an exit transport means for depositing clean, dry sorted pulverized recyclable brittle material in a collection container. Each transport means comprising an auger as depicted is enclosed and essentially sealed such that minimal particulates escape each auger. Additionally, the entire system is essentially sealed.

Any remaining contaminates are sucked off by vertically dropping the material past vacuum 32 and vacuum 34, which back suck steam or moisture, dust and airborne contaminants into respective collection bags 36 and 40. Collection bag 38 also collects airborne contaminants. Note that vacuum 32 is coupled to air outlet 33 of pulverizer pass 16. Note also that while vacuum 32 is positioned to suck contaminants from within pulverizing pass 16, vacuum 34 is positioned to suck contaminants as the appropriately sized glass particles exit the system via drop outlet 58. The material is continually being dried as hot air is circulated throughout the system. The dried and appropriately sized glass particles exit shaker separator 24 via outlet 42. As shown in FIG. 5, in one embodiment outlet 42 is terminal outlet for the system such that a collector container can be positioned to collect the dried and appropriately sized glass particles. FIGS. 1 and 2 show an embodiment which utilizes the auger mentioned above, and identified as auger 30, to drop the dried and appropriately sized glass particles through drop outlet 58 to enable vacuum 34 to suck out dust or other contaminants. The glass particles are then dropped into a collector container (not shown).

As mentioned above, FIGS. 3 and 4 are respectively side and front views of enlarged schematic depictions of pulverizer pass 16, open flame furnace 18, and vacuum 32. In addition to the pulverizing pass 16, the open flame furnace 18, and vacuum 32, also depicted are replaceable impact blades 48, adjustable crushing plate 46, and an example of a means for rotating the rotor shaft. The example of the means for rotating the rotor shaft comprises a rotor 50 which is rotatably fixed to a rotor shaft 25, a rotor belt 52, a motor rotor 54, which is rotatably fixed to a motor shaft (not shown) and a motor 56. Motor 56 rotates the motor shaft and motor rotor 54. Rotation of motor rotor 54 drives belt 52 which in turn rotates the crusher via rotor 50 and rotor shaft 25 as belt 52 is held in tension around rotor 50 and motor rotor 54. Rotor shaft 25 has a rotor bearing 53 and a locking collar 55. Motor 56 rests on an adjustable motor base 57.

As mentioned above, the brittle recyclable material is clipped as it drops through an open flame from furnace or dryer 18 and passes between an adjustable crushing plate 46 where it is clipped by replaceable impact blades 48 of variable speed rotating impact hammers 23. As indicated above, each impact blade 48 extends from a blade mounting base 64. Note that highly durable material 49 is hardwelded onto replaceable impact blades 48 to increase the life span of the blades. Other components such as deflector plate 20 and adjustable crushing plate 46 also have a highly durable material welded on their surfaces to yield a hardface welding which increase the life span of the components. These hardface weldings on the deflector plate and adjustable crushing plate are shown in FIG. 3 respectively at 20b and 46a. Note also that a wear plate 51 is attached to each blade mounting base 64. The reversible deflector plate 20, forces the heated brittle recyclable material to drop to the bottom of the pulverizing pass 16 where it exits the pulverizer pass 16 via auger 22.

Accordingly, the reader will see this invention can convert post consumer waste glass from a financially draining waste product which is presently filling landfills and polluting the environment into a valuable raw material. Furthermore, the processing system has additional advantages in that:

it permits an immediate change in the way a community looks at recycling broken mixed waste glass.

it provides a way for every community to afford to immediately begin to recycle its broken mixed waste glass.

it provides a finished product that can easily be handled since the finished product has rounded edges.

it provides a contaminant free raw material that can be used in any of the present uses for recycled glass, or any of the new uses that will now come on line.

While my above description contains many specificities, these should not be construed as limiting the scope of the invention but as merely providing illustrations of some of the presently preferred embodiments of this invention. Many other variations are possible. For example:

the pass through chamber can be made smaller or larger, and of a different material.

the hammers can be made shorter or longer, of a different material, and either hard welded or not hard welded. They can also be made a different shape.

the adjustable plate can be made of different materials, and either hard welded or not hard welded.

the open flame furnace can be smaller or larger, or directed at the glass from a different angle.

the shaker separator can be smaller or larger.

the augers can be smaller or larger, or eliminated and replaced by other transport means such as conveyor belts.

the system can be modular or made in sections.

the pulverizer can be made to work in conjunction with the rest of the system, or can be made to work by itself.

the feed can be from an auger or conveyor belt, or simply from a hopper attached to the top of the pulverizer.

the system can be a sealed system, or an open system.

the over sized material can be sent through the clipping process again, or exited immediately.

the pulverizer can process other brittle recyclable materials other than glass, such as ceramics, tile scrap, fiberglass, pottery, and etc.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for pulverizing brittle recyclable material mixed with paper and other non-brittle debris and for separating the pulverized brittle recyclable material from the paper and other non-brittle debris, the system comprising:

a pulverizing pass having a crushing plate extending therein, the pulverizing pass being configured to receive brittle recyclable material, a rotatable crusher including a rotor shaft which is rotatably and horizontally mounted within the pulverizing pass, means for rotating the rotor shaft, and a plurality of hammers extending from the rotor shaft, wherein each hammer has two arms extending from opposing ends of the rotor shaft and each arm is coupled to a blade mounting base, wherein an impact blade extends from each blade mounting base of each hammer in a configuration to provide a close tolerance with the crushing plate of the pulverizing pass such that brittle recyclable material is pulverized as the hammers are rotated past the crushing plate, and wherein each hammer has an open section defined by the rotor shaft, the two arms, and the blade mounting base such that each hammer is substantially open;

drying means for heating the brittle recyclable material, the drying means being coupled to the pulverizing pass in a configuration such that the brittle recyclable material is dried in the pulverizing pass before being pulverized; and means for separating the pulverized brittle recyclable material from the paper and other non-brittle debris by size.

2. The material processing system of claim 1, wherein the crushing plate extending within the pulverizing pass is adjustable.

3. The material processing system of claim 1, wherein each impact blade is replaceable.

4. The material processing system of claim 1, wherein said plurality of hammers can be varied in speed by the means for rotating the rotor shaft.

5. The material processing system of claim 1, wherein the pulverizing pass is lined with replaceable liners.

6. The material processing system of claim 1, further comprising a hopper configured to receive a brittle recyclable material; and brittle recyclable material transport means for transporting the brittle recyclable material from the hopper.

7. The material processing system of claim 6, further comprising another drying means for heating the brittle recyclable material in the brittle recyclable material transport means.

8. The material processing system of claim 1, further comprising pulverized material transport means for transporting the pulverized brittle recyclable material from the pulverizer pass to the sorting means.

9. The material processing system of claim 8, wherein the transport means is essentially enclosed and essentially sealed such that minimal particulates escape the transport means.

10. The material processing system of claim 1, further comprising vacuum means for removing contaminants and moisture from the brittle recyclable material.

11. The material processing system of claim 1, wherein the system is sufficiently compact and sized such that the system fits on a conventional tractor trailer.

12. The material processing system of claim 1, wherein the pulverizing pass has a deflector plate positioned above the rotor shaft and the plurality of hammers extending from the rotor shaft.

13. The material processing system of claim 1, wherein the plurality of hammers of the rotatable crusher includes four hammers configured perpendicular to each other.

14. The material processing system of claim 1, wherein the open section is sufficiently large that paper and other non-brittle debris pass through the open section without being shredded between the impact blades and the crushing plate of the pulverizing pass and then exit the pulverizing pass, thereby minimizing the amount of potential contaminants irretrievably intermixed with the brittle recyclable material as the paper and other non-brittle debris are subsequently separated from the pulverized brittle recyclable material by the separating means.

15. The material processing system of claim 1, wherein a wear plate is attached to each blade mounting base.

16. The material processing system of claim 1, wherein a highly durable material is hardwelded onto each impact blade.

17. The material processing system of claim 1, wherein the separating means also sorts the pulverized brittle recyclable material by size to separate any oversized pulverized brittle recyclable material from pulverized brittle recyclable material having a desired size.

18. The material processing system of claim 1, further comprising oversized sorted material transport means for returning pulverized brittle recyclable material, which has been sorted and is oversized, back to the pulverizing pass for further pulverizing.

19. A system for pulverizing brittle recyclable material mixed with paper and other non-brittle debris and for separating the pulverized brittle recyclable material from the paper and other non-brittle debris, the system comprising:

a pulverizing pass adapted to receive brittle recyclable material and having a crushing plate extending therein, a rotatable crusher including,
a rotor shaft which is rotatably and horizontally mounted within the pulverizing pass,
means for rotating the rotor shaft, and
four hammers extending perpendicularly from the rotor shaft such that each hammer is perpendicular with respect to each adjacent hammer,
wherein each hammer has two arms extending from opposing ends of the rotor shaft,
wherein a replaceable impact blade extends from the arms of each hammer in a configuration to provide a close tolerance with the crushing plate of the pulverizing pass such that brittle recyclable material is pulverized as the hammers are rotated past the crushing plate, and
wherein each hammer has an open section defined by the rotor shaft, the two arms, and the impact blade such that each hammer is substantially open;

drying means for drying the brittle recyclable material, the drying means being coupled to the pulverizing means in a configuration such that the brittle recyclable material is heated in the pulverizing pass before being pulverized;

a shaker separator configured to sort the pulverized brittle recyclable material by size after being pulverized and after exiting the pulverizing pass and configured to separate the pulverized brittle recyclable material from the paper and other non-brittle debris by size;

pulverized material transport means for transporting the pulverized brittle recyclable material from the pulverizing pass to the shaker separator.

20. The material processing system of claim 19, wherein the pulverizing pass has a deflector plate positioned above the rotor shaft and the plurality of hammers extending from the rotor shaft.

21. The material processing system of claim 19, wherein the open section is sufficiently large that paper and other non-brittle debris pass through the open section without being shredded between the impact blades and the crushing plate of the pulverizing pass and then exit the pulverizing pass, thereby minimizing the amount of potential contaminants irretrievably intermixed with the brittle recyclable material as the paper and other non-brittle debris are subsequently separated from the pulverized brittle recyclable material by the separating means.

22. The material processing system of claim 19, further comprising a hopper configured to receive a brittle recyclable material; and brittle recyclable material transport means for transporting the brittle recyclable material from the hopper.

23. The material processing system of claim 19, further comprising vacuum means for removing contaminants and moisture from the brittle recyclable material.

24. The material processing system of claim 19, further comprising oversized sorted material transport means for returning pulverized brittle recyclable material from the shaker separator, which has been sorted and is oversized, back to the pulverizing pass for further pulverizing.

25. An apparatus for pulverizing a brittle recyclable material without substantially shredding paper and other non-brittle debris mixed with the brittle recyclable material to enable the pulverized brittle recyclable material to be separated from the paper and other non-brittle debris by size, the apparatus comprising:

a pulverizing pass having a crushing plate extending therein;

a rotatable crusher including
 a rotor shaft which is rotatably and horizontally mounted within the pulverizing pass,
 means for rotating the rotor shaft, and
 a plurality of hammers extending from the rotor shaft,
  wherein each hammer has two arms extending from opposing ends of the rotor shaft, each arm being coupled to a blade mounting base,
  wherein a replaceable impact blade extends from each blade mounting base of each hammer in a configuration to provide a close tolerance with the crushing plate of the pulverizing pass such that brittle recyclable material is pulverized as the hammers are rotated past the crushing plate, and
  wherein each hammer has an open section defined by the rotor shaft, the two arms, and the blade mounting base such that each hammer is substantially open; and drying means for drying the brittle recyclable material, the drying means being coupled to the pulverizing pass such that the brittle recyclable material is heated before being pulverized.

26. The apparatus as recited in claim 25, wherein the pulverizing pass has a deflector plate positioned above the rotor shaft and the plurality of hammers extending from the rotor shaft.

27. The apparatus as recited in claim 25, wherein the plurality of hammers of the rotatable crusher includes four hammers configured perpendicular to each other.

28. The apparatus as recited in claim 25, wherein the open section is sufficiently large that paper and other non-brittle debris pass through the open section without being shredded between the impact blades and the crushing plate of the pulverizing pass and then exit the pulverizing pass, thereby enabling paper and other non-brittle debris to be subsequently separated from the pulverized brittle recyclable material such that the amount of potential contaminants irretrievably intermixed with the brittle recyclable material is minimized.

29. The apparatus as recited in claim 25, wherein a wear plate is attached to each blade mounting base.

30. The apparatus as recited in claim 25, wherein the crushing plate extending within the pulverizing pass is adjustable.

31. The apparatus as recited in claim 25, wherein a highly durable material is hardwelded onto each impact blade.

32. The apparatus as recited in 25, wherein the pulverizing pass is lined with replaceable liners.

33. The apparatus as recited in 25, wherein said plurality of hammers can be varied in speed by the means for rotating the rotor shaft.

34. An apparatus for pulverizing a brittle recyclable material without substantially shredding paper and other non-brittle debris mixed with the brittle recyclable material to enable the pulverized brittle recyclable material to be separated from the paper and other non-brittle debris by size, the apparatus comprising:

a pulverizing pass having a replaceable crushing plate extending therein and a deflector plate positioned above the replaceable crushing plate;

a rotatable crusher including
 a rotor shaft which is rotatably and horizontally mounted within the pulverizing pass below the deflector plate,
 means for rotating the rotor shaft, and
 four hammers extending perpendicularly from the rotor shaft such that each hammer is perpendicular with respect to each adjacent hammer,
  wherein each hammer has two arms extending from opposing ends of the rotor shaft, each arm being coupled to a blade mounting base,
  wherein a replaceable impact blade extends from each blade mounting base of each hammer in a configuration to provide a close tolerance with the crushing plate of the pulverizing pass such that the brittle recyclable material is pulverized as the hammers are rotated past the crushing plate, and
  wherein each hammer has an open section defined by the rotor shaft, the two arms, and the blade mounting base such that each hammer is substantially open; and a dryer coupled to the pulverizing pass and positioned such that the brittle recyclable material is heated before being pulverized.

35. The apparatus as recited in claim 34, wherein the open section is sufficiently large that paper and other non-brittle debris pass through the open section without being shredded between the impact blades and the crushing plate of the pulverizing pass and then exit the pulverizing pass, thereby enabling paper and other non-brittle debris to be subsequently separated from the pulverized brittle recyclable material such that the amount of potential contaminants irretrievably intermixed with the brittle recyclable material is minimized.

36. The apparatus as recited in claim 34, wherein deflector plate positioned above the replaceable crushing plate is adjustable.

37. The apparatus as recited in claim 34, wherein the crushing plate extending within the pulverizing pass is adjustable.

38. A method of separating brittle recyclable material from a mixture of brittle recyclable material with paper and other non-brittle debris, comprising:

obtaining brittle recyclable material, delivering the brittle recyclable material into a pulverizing pass having a crushing plate such that the brittle recyclable material is directed toward a plurality of hammers extending from a rotor shaft mounted within the pulverizing pass to horizontally rotate within the pulverizing pass, each hammer having two arms extending from opposing ends of the rotor shaft and having a blade mounting base extending from the arms such that each hammer has an open section defined by the rotor shaft, the two arms, and the blade mounting base and such that each hammer is substantially open, heating the brittle recyclable material in the pulverizing pass before the brittle recyclable material is pulverized, pulverizing the brittle recyclable material between the crushing plate of the pulverizing pass and an impact blade extending from the blade mounting base of each hammer by rotating the hammers while also permitting paper and other non-brittle debris to pass through the open sections without being shredded between the impact blades and the crushing plate of the pulverizing pass, and separating the pulverized brittle recyclable material from paper and other non-brittle debris to minimize the amount of potential contaminants irretrievably intermixed with the brittle recyclable material.

39. The method as recited in 38, further comprising the step of deflecting any pulverized brittle recyclable materials directed upwards within the pulverizing pass back down towards the open sections.

40. The method as recited in 38, further comprising the step of heating the brittle recyclable material before the brittle recyclable material is delivered into the pulverizing pass.

41. The method as recited in 38, further comprising the step of vacuuming off contaminants and moisture from the brittle recyclable material.

42. The method as recited in 38, further comprising the step of vacuuming off contaminants and moisture from the brittle recyclable material passing through the pulverizing pass such that the contaminates are substantially removed as the material passes vertically in the pulverizing pass.

43. The method as recited in 38, further comprising the step of sorting the pulverized brittle recyclable material by size.

44. The method as recited in 38, further comprising the steps of:

sorting the pulverized brittle recyclable material by size, and returning any pulverized brittle recyclable material which is oversized back to the pulverizing pass for further pulverizing.

45. The method as recited in 38, further comprising the steps of:

sorting the pulverized brittle recyclable material by size, and vacuuming off contaminants and moisture from the brittle recyclable material which is appropriately sized as the appropriately sized brittle recyclable material drops past a vacuum.

46. A method of pulverizing brittle recyclable material comprising:

obtaining brittle recyclable material, delivering the brittle recyclable material into a pulverizing pass having a crushing plate such that the brittle recyclable material is directed toward a plurality of hammers extending from a rotor shaft mounted within the pulverizing pass to horizontally rotate within the pulverizing pass, each hammer having at least one arm extending from the rotor shaft and having a blade mounting base extending between the arm such that each hammer has an open section defined by the rotor shaft, the arm, and the blade mounting base and such that each hammer is substantially open, heating the brittle recyclable material in the pulverizing pass before the brittle recyclable material is pulverized, pulverizing the brittle recyclable material between the crushing plate of the pulverizing pass and an impact blade extending from the blade mounting base of each hammer by rotating the hammers while also permitting paper and other non-brittle debris to pass through the open sections without being shredded between the impact blades and the crushing plate of the pulverizing pass, deflecting any pulverized brittle recyclable materials directed upwards within the pulverizing pass back down towards the open sections, and separating the pulverized brittle recyclable material from paper and other non-brittle debris to minimize the amount of potential contaminants irretrievably intermixed with the brittle recyclable material.

* * * * *